(12) United States Patent
Chelian et al.

(10) Patent No.: US 8,468,104 B1
(45) Date of Patent: Jun. 18, 2013

(54) SYSTEM FOR ANOMALY DETECTION

(75) Inventors: Suhas E. Chelian, Los Angeles, CA (US); Narayan Srinivasa, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 867 days.

(21) Appl. No.: 12/592,837

(22) Filed: Dec. 2, 2009

(51) Int. Cl.
    *G06F 15/18* (2006.01)
(52) U.S. Cl.
    USPC .......................................................... 706/12
(58) Field of Classification Search
    USPC .......................................................... 706/12
    See application file for complete search history.

(56) References Cited

U.S. PATENT DOCUMENTS

| | | | | |
|---|---|---|---|---|
| 7,581,170 B2 * | 8/2009 | Baumgartner et al. | ....... | 715/234 |
| 7,613,272 B2 * | 11/2009 | Sutton et al. | ................... | 376/267 |
| 7,616,727 B2 * | 11/2009 | Sutton et al. | ................... | 376/267 |
| 7,636,652 B2 * | 12/2009 | Kropaczek et al. | ............... | 703/6 |
| 7,756,879 B2 * | 7/2010 | Parsons et al. | ................. | 707/748 |
| 7,783,542 B2 * | 8/2010 | Horowitz | ......................... | 705/35 |
| 7,783,543 B2 * | 8/2010 | Horowitz | ......................... | 705/35 |
| 7,783,544 B2 * | 8/2010 | Horowitz | ......................... | 705/35 |
| 7,941,305 B2 * | 5/2011 | Kropaczek et al. | ............... | 703/6 |
| 8,021,848 B2 * | 9/2011 | Straus | ............................ | 435/7.1 |
| 8,082,196 B2 * | 12/2011 | Mullan et al. | ................... | 705/35 |
| 8,108,260 B2 * | 1/2012 | Maguire et al. | ............. | 705/26.1 |
| 8,266,042 B2 * | 9/2012 | Horowitz et al. | ................ | 705/37 |

OTHER PUBLICATIONS

G.A. Carpenter, et al., "A massively parallel architecture for a self-organizing neural pattern recognition machine," Computer Vision, Graphics, and Image Processing, 37:54-115, 1987.

B. Fritzke, "Fast learning with incremental RBF networks," Neural Processing Letters, 1: 2-5, 1994.
A. Gorchetchnikov, et al., "Space, time, and learning in the hippocampus: how fine spatial temporal scales are expanded into population code for behavioral control," Neural Networks, 2006.
T. Hafting, et al., "Microstructure of the spatial map in the entorhinal cortex," Nature 436:800-806, 2005.
M. Markou, et al., "Novelty detection: a review—part 1: statistical approaches," Signal processing, 83: 2481-2497, 2003.
M. Markou, et al., "Novelty detection: a review—part 2: neural network based approaches," Signal processing, 83: 2499-2521, 2003.
A. Nowak, et al., "Functional three-dimensional distribution of entorhinal projections to dentate granule cells of the in vivo rabit hippocampus," Society for Neuroscience Abstracts, 18:141.15, 1992.
T. Otto, et al., "Neuronal activity in the hippocampus during delayed non-match to sample performance in rats: evidence for hippocampal processing in recognition memory," Hippocampus, 2: 323-332, 1992.
S. Grossberg, et al., "A neural network model of adaptively timed reinforcement learning and hippocampal dynamics," Cognitive Brain Research, 1:3-38, 1992.

\* cited by examiner

*Primary Examiner* — Michael B Holmes
(74) *Attorney, Agent, or Firm* — Tope-Mckay & Associates

(57) ABSTRACT

Described is a system for anomaly detection to detect an anomalous object in an image, such as a concealed object beneath a person's clothing. The system is configured to receive, in a processor, at least one streaming peaked curve (R) representative of a difference between an input and a chosen category for a given feature. A degree of match is then generated between the input and the chosen category for all features. Finally, the degree of match is compared against a predetermined anomaly threshold and, if the degree of match exceeds the predetermined anomaly threshold, then the current feature is designated as an anomaly.

9 Claims, 8 Drawing Sheets

SYSTEM FOR ANOMALY DETECTION

FIELD OF INVENTION

The present invention relates to an anomaly detection system and, more particularly, to system that utilizes a neural circuit design based on a population code to detect an anomaly.

BACKGROUND OF INVENTION

Novelty detection (or anomaly detection) is the process by which input patterns are judged to deviate from the norm(s) in a dataset. In operation, an anomaly detection system can be used to detect an anomalous pattern, such as the presence of an unexpected object or event. Such systems can be employed in the security industry to detect concealed objects underneath a person's clothing and typically use millimeter wave image (mmW) and backscatter X-ray images. The objective in such a system is to automate the process so that a human operator is not required to look at raw data. However, a visible image does not identify concealed objects. Alternatively, raw scans (such as the mmW and backscatter X-ray images) reveal what is underneath the clothing, which is the naked appearance of subjects. In the current state of technology, human operators have to directly inspect the scans displaying human subjects essentially in a naked form. Thus, such systems cannot be made operational in public for privacy reasons.

Additionally, several recent patent applications have been filed that reveal a number of anomaly detection related systems devised within the context of medical imaging. The focus of related prior art on anomaly detection in the context of medical imaging is often on feature based anomalous/cancerous cell detection. For example, U.S. patent application Ser. No. 10/633,815, by Wrigglesworth et al., describes a system for detecting anomalous targets, namely cancerous cells. In this particular paradigm, a predefined number of features are extracted from a particular set of cell imagery. The features are then used to generate a probabilistic belief function to determine a probability that at least some of the cells in an image set are anomalous.

As another example, U.S. Pat. No. 7,072,435, issued to Metz et al., describes a system that processes computer tomography scans for detecting anomalous cancerous cells associated with lung cancer. The novelty in this particular patent is the use of CT imaging modality, while the algorithms for determining anomalies are somewhat standard computer aided detection (classification) methods.

As yet another example, U.S. patent application Ser. No. 10/352,867, by Parker et al., describes a system in which segmentation and localization of biomarkers, such as liver metastases and brain lesions, are cast as an anomaly detection problem. Statistical segmentation methods are used to identify biomarkers in the first image and the process is carried over to several subsequent images that are time evolutions of the biological construct (liver or brain tissue) that is under observation. The method relies on processing temporal sequences of three-dimensional medical imagery (instead of two-dimensional views).

The prior art described above is limited to the particular types of imagery previously described. The limitation is primarily due to availability and the need for use of such scanning modalities. Prior art in the medical imaging domain uses anomaly detection to identify cancerous lesions. In the mmW and backscatter X-ray image analysis domain, device manufacturers have made attempts at bringing together a combination of off-the-shelf algorithms to analyze images for weapon detection, yet a reliable system does not currently exist that is able to detect anomalies in variety of circumstances.

The present invention improves upon the simple imaging concept of the prior art by expanding the anomaly detection concept to incorporate population code based models that use adaptively timed learning. Such a population code model was described by Gorchetchnikov, A. and S. Grossberg in "Space, time, and learning in the hippocampus: how fine spatial and temporal scales are expanded into population code for behavior control," Neural Networks (2006), Volume 20, pp 182-193, and by Grossberg, S. and J. Merrill in "A neural network model of adaptively timed reinforcement learning and hippocampal dynamics," Cognitive Brain Research (1992), pp 3-38.

Previous models using a spectral population code have not been applied to novelty (anomaly) detection and do not consider a serial architecture. Some aspects of the design are derived from adaptively timed learning approaches (i.e., Grossberg and Merrill 1992; Gorchetchnikov and Grossberg 2006), and the present invention for anomaly detection is based on a computational model that conforms to anatomical (structural/static) and physiological (functional/dynamic) constraints in the mammalian brain during the detection of anomalous events. A unique aspect of this design is that it offers a trade-off in spatial or temporal resources. This makes the present invention more applicable to a wider array of computational platforms with vastly different scales. The ability to address a wider array of computational platforms, in turn, makes the present invention more relevant to a larger set of application domains requiring large scale novelty detection.

Thus, a continuing need exists for an anomaly detection system that utilizes a neural circuit design with parallel and distributed processing.

SUMMARY OF THE INVENTION

As mentioned above, the present invention is an anomaly detection system. The system comprises one or more processors that are configured to receive, in a processor, at least one streaming peaked curve (R) representative of a difference between an input and a chosen category for a given feature. A degree of match is then generated between the input and the chosen category for all features. The degree of match is then compared against a predetermined anomaly threshold and, if the degree of match exceeds the predetermined anomaly threshold, then designating the current input as an anomaly.

In another aspect, the processor is further configured to perform operations of:
a. determining if the streaming peaked curve is increasing over time;
  i. if the streaming peaked curve is increasing over time, then;
    1. incrementing a counter with the streaming peaked curve over time, then repeating the act of determining if the streaming peaked curve is increasing over time;
  ii. if the streaming peaked curve is NOT increasing over time, then the counter is not updated and a peak of the streaming peaked curve is identified, then continuing;
b. updating a running average of the counter with previous values of the counter and a current value of the counter;
c. determining if R has just peaked:

i. if R has not just peaked, then continuing to determine if R has just peaked;

ii. if R has just peaked, then continuing;

d. updating a running average of all previously seen featural differences for future iterations;

e. determining if all featural differences have been received i. if all featural differences have not been received, then receiving more streaming peaked curves; and ii. if all featural differences have been received, then generating the degree of match between the input and chosen category for all features.

In yet another aspect, the processor is further configured to perform operations of:

a. receiving, in the processor, at least a second streaming peaked curve (R) such that the processor is collectively receiving a plurality of streaming peaked curves (R), each representative of a difference between an input and a chosen category for a given feature;

b. determining if all features have been accounted for;

i. if all features have been accounted for, then generating a degree of match between the input and chosen category for all features and ending; and ii. if all features have not been accounted for, then continuing;

c. determining, for each streaming peaked curve, if the streaming peaked curve is increasing over time;

i. if the streaming peaked curve is increasing over time, then;

1. incrementing a counter with the streaming peaked curve over time;

2. determining and storing a sum of the counters across all features, then repeating the act of determining if all features have been accounted for; and ii. if the streaming peaked curve is NOT increasing over time for the given feature, then stopping the counter and determining if the streaming peaked curve is NOT increasing over time for all streaming peaked curves, then the counters are not updated, then repeating the act of determining if all features have been accounted for.

Finally, as can be appreciated by one skilled in the art, the present invention also includes a computer program product and a method for detecting an anomaly. The computer program product comprises computer-readable instruction means stored on a computer-readable medium that are executable by a computer for causing the computer to perform the operations and acts described herein. Further, the method is a computer implemented method that includes a plurality of acts of causing a processor to perform the operations said herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
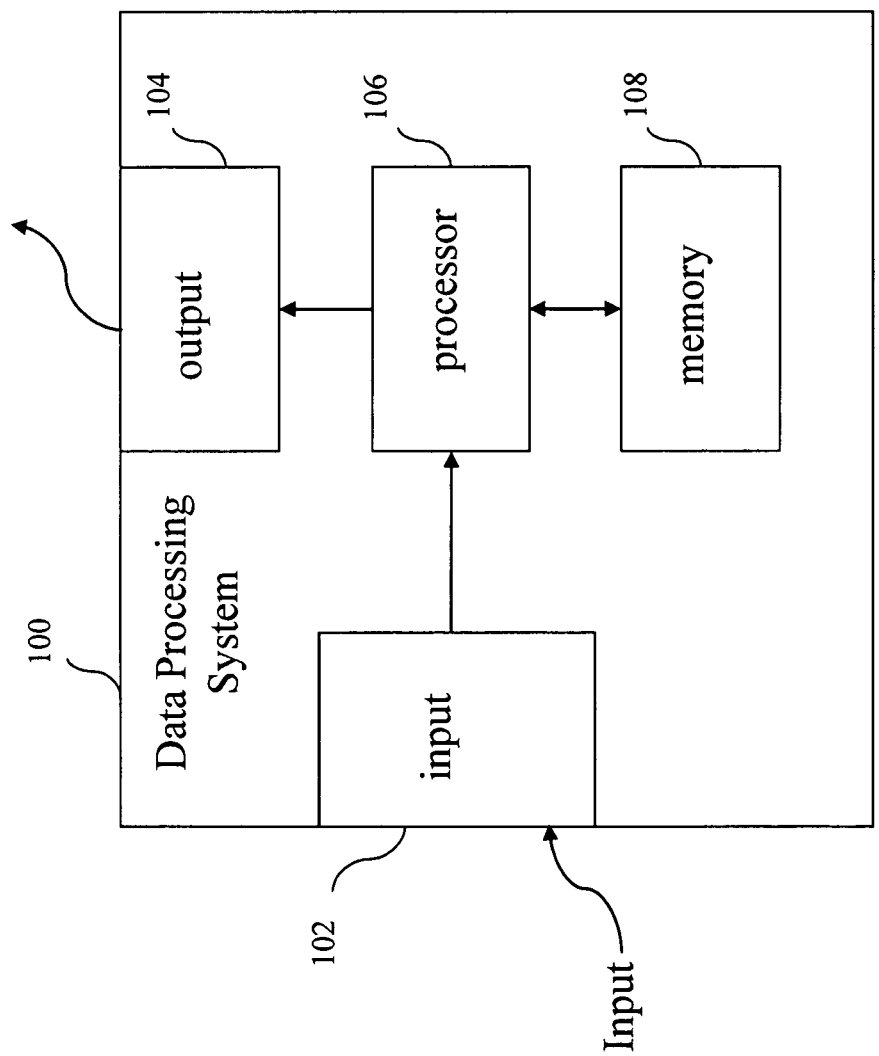
FIG. 1 is a block diagram depicting the components of an anomaly detection system of the present invention.

The present invention relates to an anomaly detection system and, more particularly, to system that utilizes a neural circuit design based on population code to detect an anomaly.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a description of various principal aspects of the present invention is provided. Subsequently, an introduction provides the reader with a general understanding of the present invention. Next, details of specific aspects of the present invention are provided to give the reader or more detailed understanding. Finally, provided are experimental results illustrating results are received from operation of the present invention.

(1) Principal Aspects

The present invention has three "principal" aspects. The first is an anomaly detection system. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions means stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting the components of an anomaly detection system of the present invention is provided in FIG. 1. The anomaly detection system 100 comprises an input 102 for receiving information from at least one sensor for use in detecting an anomaly. Note that the input 102 may include multiple "ports." Typically, input is received from at least one sensor, non-limiting examples of which include video image sensors or any other suitable sensor. An output 104 is connected with the processor for providing information regarding an anomaly to other systems in order that a network of computer systems may serve as an anomaly detection system. Output may also be provided to other devices or other programs; e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software that are to be manipulated by commands to the processor 106.

Figure 2:
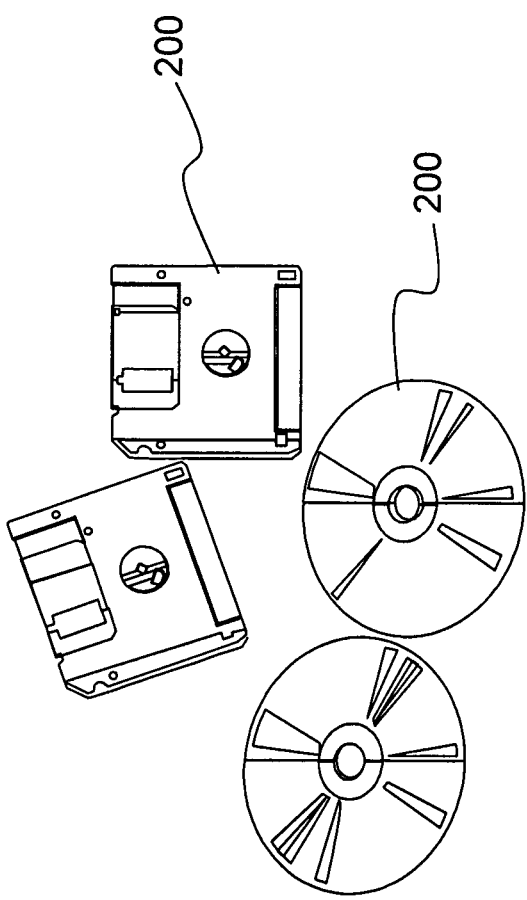
FIG. 2 is an illustration of a computer program product embodying the present invention.

An illustrative diagram of a computer program product embodying the present invention is depicted in FIG. 2. The computer program product 200 is depicted as an optical disk such as a CD or DVD. However, as mentioned previously, the computer program product generally represents computer-readable instruction means stored on any compatible computer-readable medium. The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e., computer operations coded into a computer chip). The "instruction means" may be stored in the memory of a computer or on a computer-readable medium such as a floppy disk, a CD-ROM, and a flash drive.

(2) Introduction

Novelty detection (or anomaly detection) is the process by which input patterns are judged to deviate from the norm(s) in a dataset. Biologically, anomaly detection is partly served by the hippocampus. In the present invention, a computational model of anomaly detection in the hippocampus is detailed based on a population code. The population code enables a spectrum of simple compute nodes to respond to featural differences between current stimuli and past prototype representations. Described below are two variations to the model that offer a trade-off between available spatial and temporal resources. This trade-off allows the present invention to be more applicable to a wider array of computational platforms with vastly different scales. The ability to address a wider array of computational platforms, in turn, makes the present invention more relevant to a larger set of application domains requiring large scale anomaly detection.

The present invention describes SPECTRAL SEPARATION ART (SET APART), a bio-inspired model and apparatus for large scale anomaly detection. It can be used to recognize anomalous patterns within any algorithm or as part of a larger systems-level application. In the present invention, a novel circuit design enables a spectrum of computational nodes to respond to the featural differences between the current stimuli and the past prototypes.

As noted above, the system for anomaly detection is scalable and applicable to a large set of application domains. Non-limiting examples of such applications include intrusion detection (i.e., the anomaly) in computer and supply networks or assembly lines, fraud detection (i.e., the anomaly) in consumer and supply networks, and surveillance or sensor networks. The anomaly detection system can be integrated into such systems as it is as an all-software solution. The anomaly detection system can also find applications in other pattern recognition systems at large scales, including learning from large social networking or video databases.

(3) Details of Specific Aspects

Anomaly detection according to the present invention relies on a unique circuit design. More specifically, the present invention is SPECTRAL SEPARATION ART (SET APART), a bio-inspired model and apparatus for large scale anomaly detection.

Figures 3A, 3B:
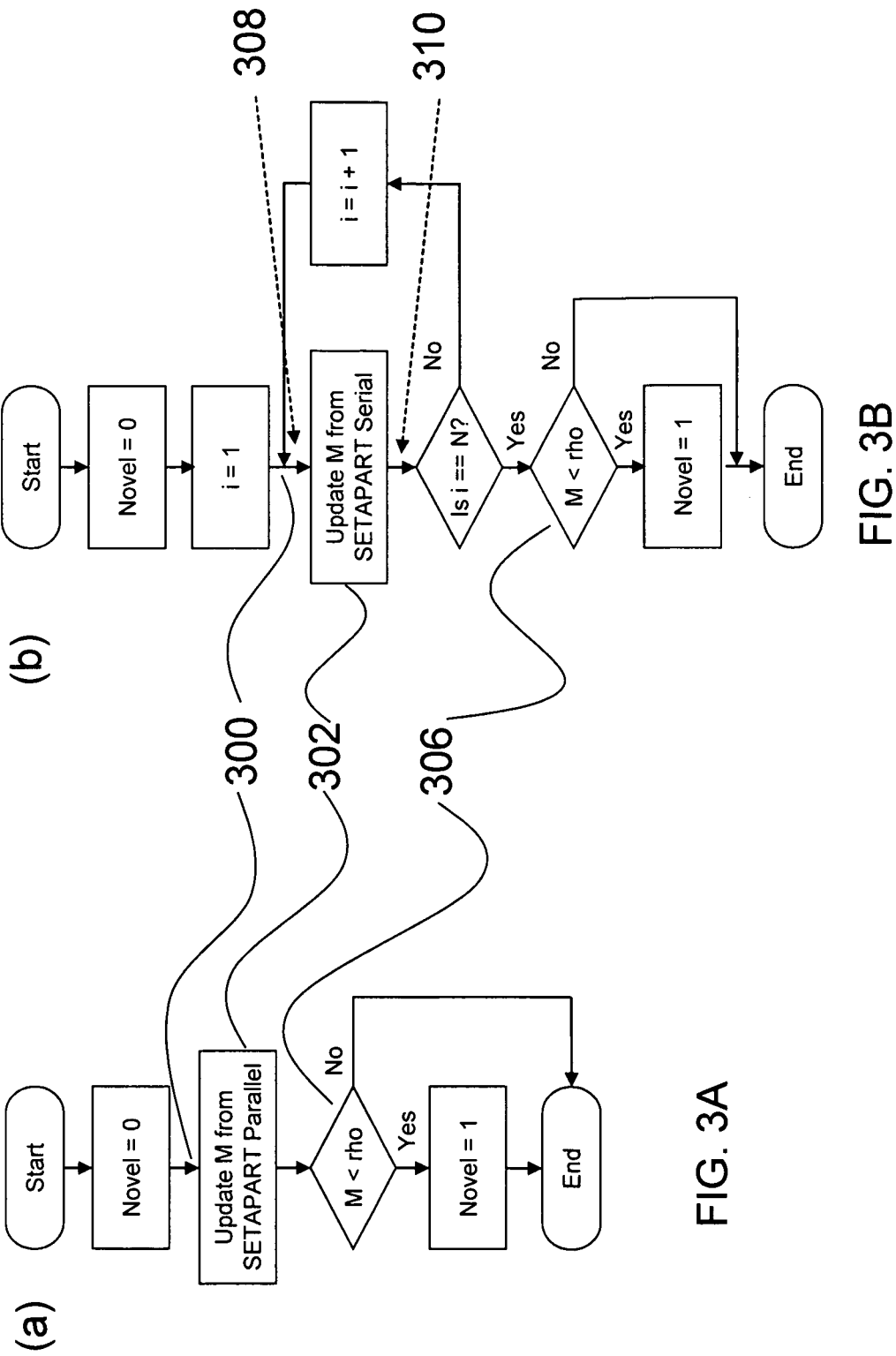
FIG. 3A is a general flow diagram of a SPECTRAL SEPARATION Adaptive Resonance Theory (SET APART) parallel feed according to the present invention.
FIG. 3B is a general flow diagram of a SET APART competitive filter according to the present invention.

In general and as illustrated in FIGS. 3A and 3B, the system is initiated by receiving, in a processor, an input (I) and a chosen category (WJ) 300 and at least one streaming peaked curve (R) representative of a difference between an input and a chosen category for a given feature. An input (I) is a vector of features (i). A chosen category (WJ) is a prototype of previously learned inputs, while a given feature is one element of a feature vector. The streaming peaked curve (R) is calculated by differential equations that trade the degree of featural mismatch for time (i.e., small differences lead to early peaks, large differences lead to late peaks).

Non-limiting examples of such an input (in a two-dimensional (2D) case) are x=0.25, y=0.75, while non-limiting examples of a chosen category are a cluster representing inputs near x=0, y=1, and non-limiting examples of a given feature are x and y. With respect to the input, x and y are two example dimensions (although the system is not limited to only two dimensions and can be expanded to include many dimensions). As non-limiting examples, x and y could be height and weight, or distance from a heating element and temperature, or time of day and price of the Dow Jones Industrial Average, etc.

A degree of match (M) is then generated 302 between the input and the chosen category for all features. The degree of match (M) is generated by SET APART Parallel or Serial. For example, FIG. 3A depicts a parallel feed where all features of (I) and (WJ) are fed into SET APART Parallel to generate (M), while FIG. 3B depicts a competitive filter, where feature (i) of (I) and (WJ) are fed into SET APART Serial to generate (M).

Thereafter, the degree of match is compared 306 against a predetermined anomaly threshold, such as an acceptable value between 1 and 100, where 100 is an absolute certainty that the input is an anomaly and 1 is the absolute certainty that the input is not an anomaly (or vice versa). If the degree of match exceeds the predetermined anomaly threshold, then the current input is designated as an anomaly (as being novel (e.g., Novel=1)). As yet another example, the predetermined anomaly threshold is rho, which can be a pre-set parameter that can be selectively determined (e.g., 60%) or can be tuned from a training set. In the latter case, it would be desirable to run stimuli through a system that has developed learned prototypes, and record the match score for each stimuli (e.g., 95%, 98%, 72%, 52%, 80%). Then, for example, the system could be programmed to provide an alert 25% of the time; thus, rho in this example would be set at 53% for this data set.

Additionally, elements 308 and 310 are meant to signify the entry and exit points, respectively, into SET APART serial for each feature. Further, 300 and 306, as in the parallel case, are the entry and exit points for SET APART serial across all features.

Thus, it should be noted that the present invention includes both parallel and serial versions of SET APART. For further illustration, FIG. 4 depicts a detailed parallel version of SET APART, while FIG. 5 depicts a detailed serial version of SET APART.

Figure 4:
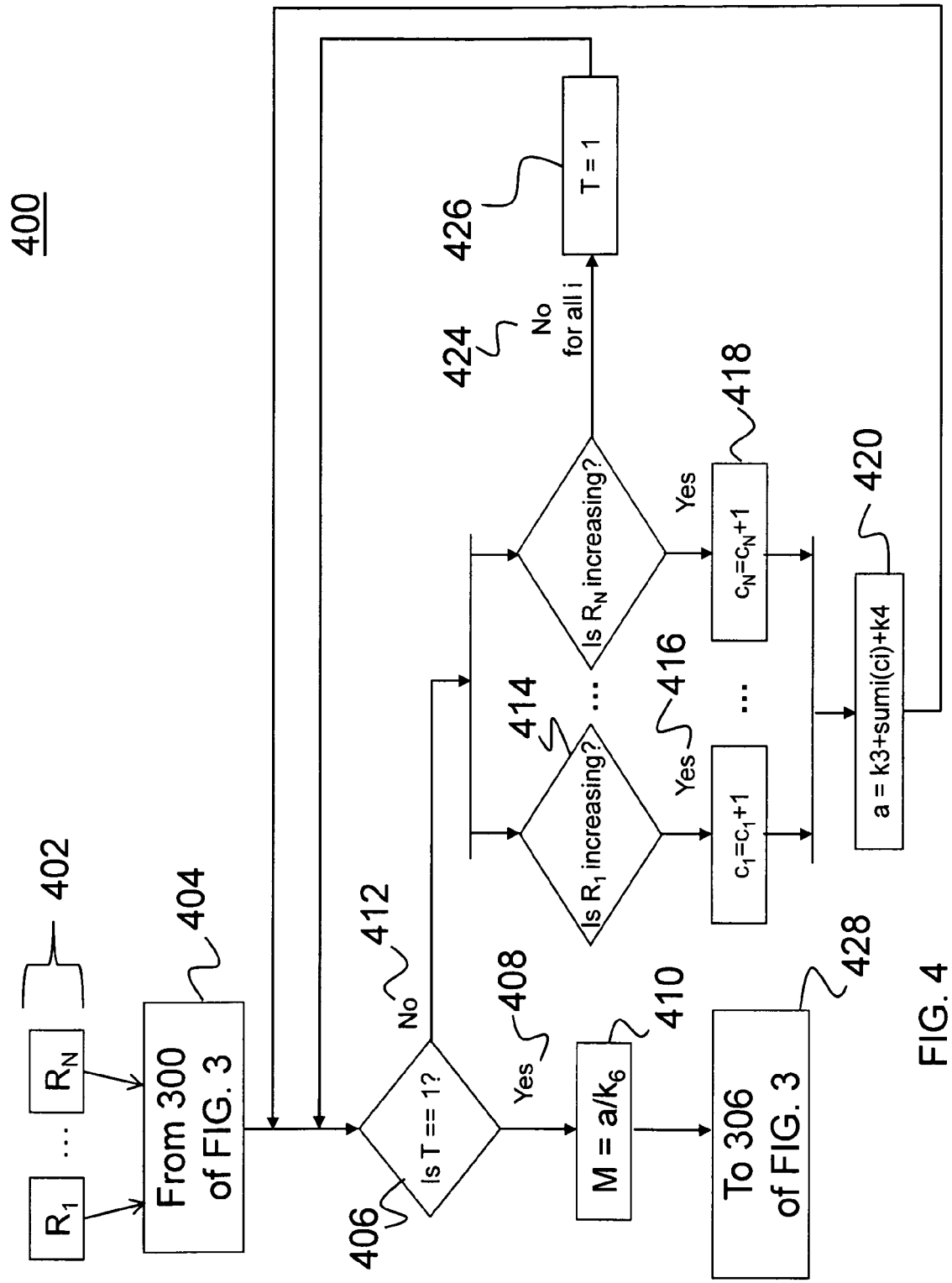
FIG. 4 is a detailed flow diagram of a parallel version of SET APART.
Figure 5:
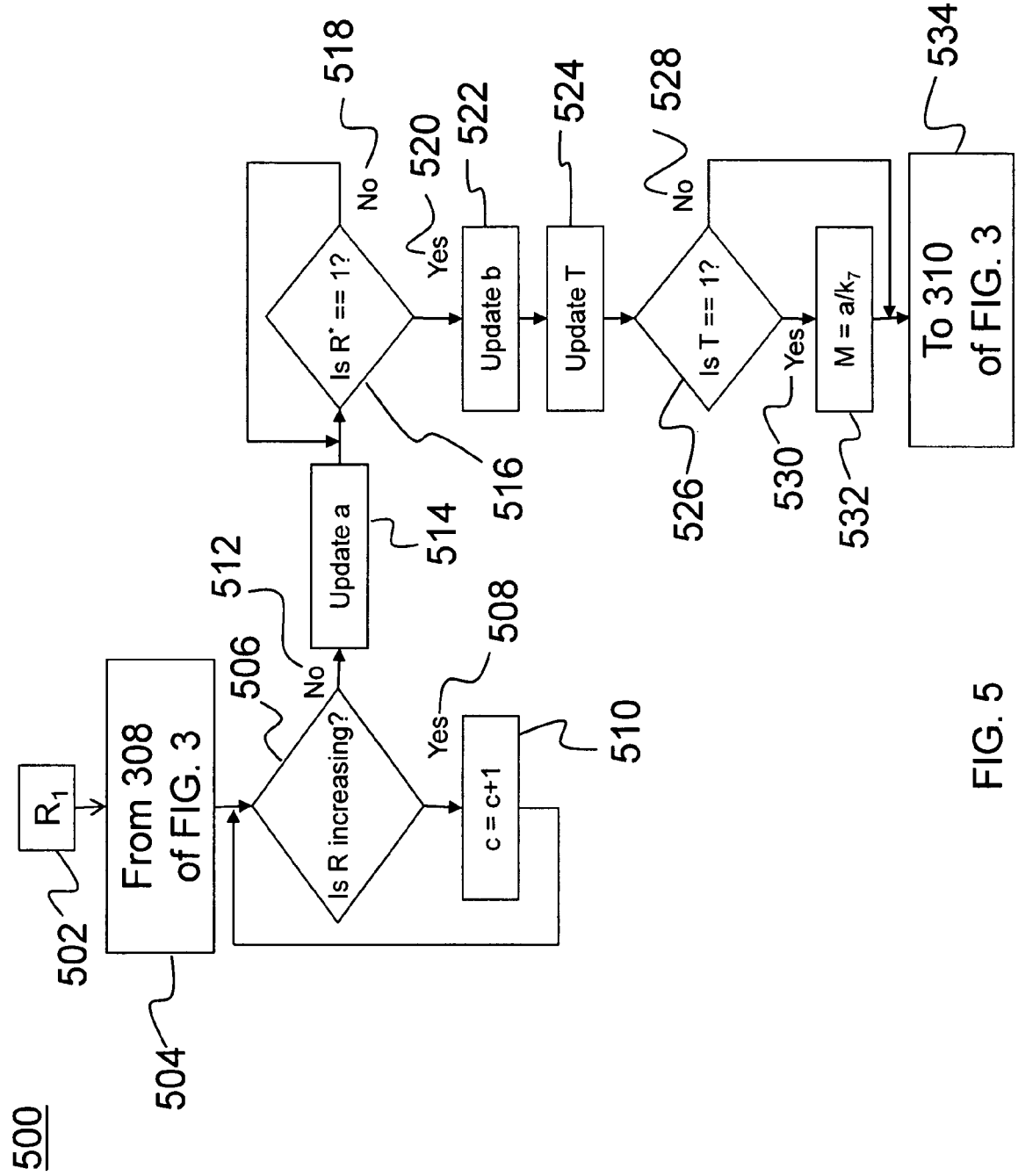
FIG. 5 is a detailed flow diagram of a serial version of SET APART.

As shown in FIG. 4, the parallel process 400 operates simultaneously on a plurality of streaming peaked curves (R) 402, each representative of a difference between an input and a chosen category for a given feature (note that all variables initially start as zero). Once initiated 404, it is then determined 406 if all features have been accounted for by determining (T). (T) gates the SET APART Parallel decision process. When (T) is zero, it indicates that there are differences, in one or more features, which have not been fully accounted for (when (T) is zero, counters, or ci's, are incremented; when (T) is one, counters are stopped.)

If all features have 408 been accounted for, then a degree of match (M) 410 is generated (as described above) between the input and chosen category for all features, with (M) then being sent 428 to element 306 of FIG. 3 for comparison. As shown in FIG. 4, (M) refers to the degree of match, while (a) refers the sum of all counters (ci's) and ($k_6$) refers to a constant that normalizes counter values to a match range. If all features have not 412 been accounted for, then the parallel process 400 continues.

It is then determined 414, for each streaming peaked curve (R), if the streaming peaked curve is increasing over time. If (R) is increasing, the difference between input and chosen category, for feature (i), has not been fully accounted for. If (R) is decreasing, the difference between input and chosen category, for feature (i) has been fully account for. The streaming peaked curve again is generated by differential equations that trade degree of featural mismatch for the temporal offset of the peak. Determining if a streaming peaked curve is increasing or decreasing can be done by comparing the present value of R to its moving average; positive (negative) values indicate increasing (decreasing) R.

If the streaming peaked curve is 416 increasing over time, then a counter (c) is incremented 418 with the streaming peaked curve over time. Each ($c_{[sub\ i]}$) increments while ($R_{[sub\ i]}$) is increasing, thus keeping track of the magnitude of the difference between input and chosen category in feature (i).

The sum (a) of the counters across all features is then determined 420 and stored. (a) is the sum of all counters (ci's); it keeps track of the difference between input and chosen category across all features. The process is then repeated beginning with the act of determining 406 if all features have been accounted for.

Alternatively, if the streaming peaked curve is NOT increasing over time for the given feature, then the counter is stopped and it is determined if the streaming peaked curve is NOT 424 increasing over time for all streaming peaked curves. In that event, the counters are not updated, T is updated 426 and the process is repeated beginning with the act of determining 406 if all features have been accounted for. This process continues until all features have 408 been accounted for, at which point a degree of match (M) 410 is generated which can then be used to compare 306 against a threshold to determine if the current input is designated as an anomaly.

As mentioned above, the present invention also includes a serial mode, where each feature channel is serialized from others and the outputs are integrated in series. This serialization can be performed by a competitive filter with asymmetric weights or predetermined asymmetric delays to deliver only one channel at a time. As shown in FIG. 5, the serial process 500 operates on a single streaming peaked curve (R) 502. Once initiated 504, it is then determined 506 if the streaming peaked curve is increasing over time. As noted above, the determination is made by comparing the present value of R to its moving average. If R is increasing, the difference between the input and chosen category, in feature (i), has not been fully accounted for.

If the streaming peaked curve is 508 increasing over time, then a counter is incremented with the streaming peaked curve over time 510. The counter increments while R is increasing, thus keeping track of the magnitude of the difference between the input and chosen category in feature (i). The serial process is then repeated beginning with the act of determining 506 if the streaming peaked curve is increasing over time.

Alternatively, if the streaming peaked curve is NOT 512 increasing over time, then the counter is not updated and a peak of the streaming peaked curve is identified. The peak of the streaming peaked curve, again, is identified by comparing the present value of R to its moving average.

Thereafter, a current running average (a) of the counter is updated 514. The current running average (a) is updated to be (ib+c)/(i+1), the typical running average formula with (b) being the old running average and (c) being the new data point. The current running average (a) is the running average of the counter (c) for feature (i) and the value of (a) from previously seen (1, 2, . . . , i−1) features given by (b), where (b) contains the running average of (c) for all features from 1 to (i). (b) is used to update (a). The value of (a) is proportional to the difference between the input and chosen category for features from 1 to (i).

It is then determined 516 if R has just peaked, that is if R* is equal to one. R* here refers to H(Rinc(t−1)-Rinc), where Rinc detects if R is increasing (as previously described) and H(•) is the Heaviside function. The Heaviside function maps all values greater than 0 to 1 and to 0 otherwise. If R has just peaked (i.e., R* is one) 520, R has just passed its maximum meaning (b) should be updated. If R has not just peaked (i.e., R* is NOT one) 518, then the process 500 reverts to determining if R has just peaked (i.e., determining if R* is one until R* is in fact one).

The running average (b) of all previously seen featural differences is then updated 522. (b) is updated to hold (a).

(T) is then updated 524. (T) increments for each feature (i); it reaches one when all features have been seen.

Based on (T), it is then determined 526 if all featural differences have been received. As a non-limiting example, it is determined if (T) is equal to one. (T) gates (M). When (T) is zero, there are more features left to be seen; whereas when (T) is one, there are no features left to be seen (or vice versa, depending on the configuration and setup).

If all featural differences have NOT 528 been received, then the system receives more streaming peaked curves.

If all featural differences have 530 been received, then the degree of match is generated 532 between the input and chosen category for all features, with (M) then being sent 534 to element 310 of FIG. 3 for further processing and/or comparison.

For example, (M) is equal to (a)/($k_{[sub\ 7]}$). (M) takes on a scaled value of (a), while ($k_{[sub\ 7]}$) is a constant that normalizes counter values to a match range. The value of (a), again, is proportional to the difference between the input and chosen category (WJ) for features from 1 to (i). As noted above, (M) holds a measure for the amount of mismatch (i.e., degree of match) between the input and chosen category across all features, which can then be used to compare 306 against a threshold to determine if the current input is designated as an anomaly. For example, the system will compare 306 (M) against a predetermined threshold (an unacceptable percentage of mismatch (e.g., mismatch greater than 10%)) to determine if the current input is anomalous, such as cancerous cells, a concealed weapon, an intruder, etc.

(4) Experimental Results

Provided below is a specific example providing experimental results of the present invention in operation. It is to be understood that the example provided below is a single, non-limiting example as the invention is not intended to be limited thereto.

Figure 6:
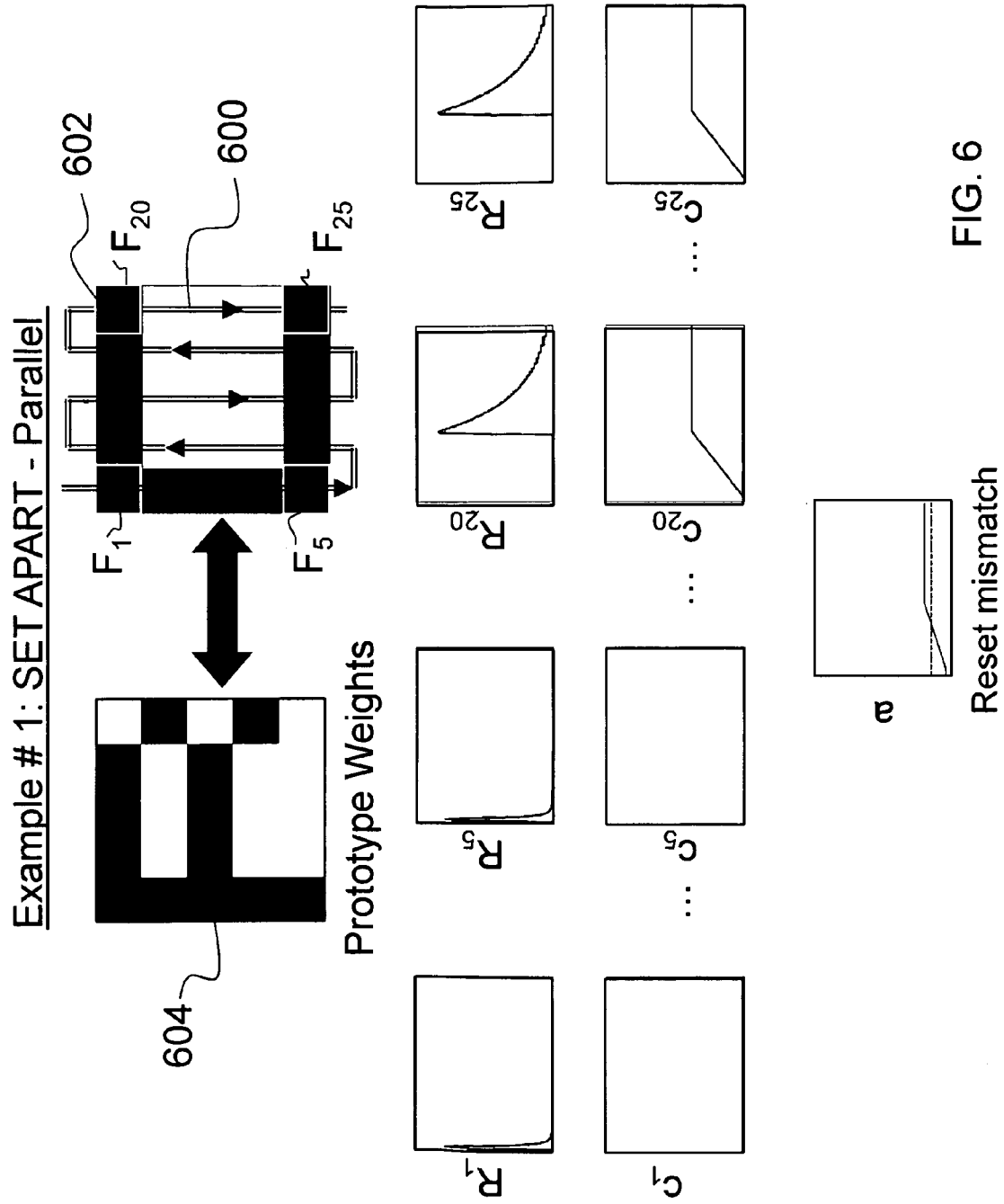
FIG. 6 is an illustration depicting binary patterns as generated by the parallel version of SET APART.
Figure 7:
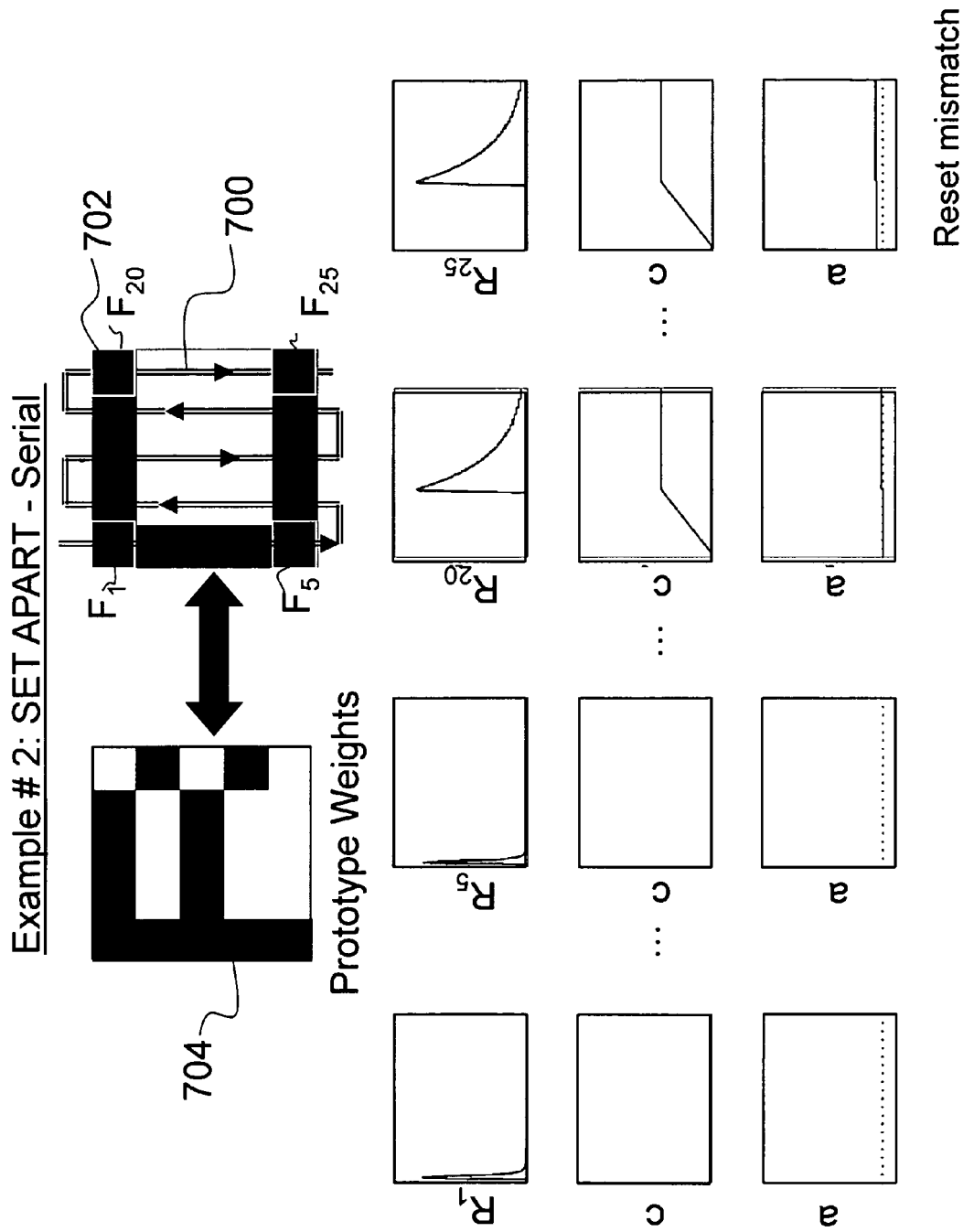
FIG. 7 is an illustration depicting binary patterns as generated by the serial version of SET APART.

Computer simulations were performed on binary feature sets and the results compare favorably to learned Adaptive Resonance Theory (ART) prototypes using traditional orienting subsystem mechanism. See Carpenter, G. A. and S. Grossberg (1987), "A massively parallel architecture for a self-organizing neural pattern recognition machine," Computer Vision, Graphics, and Image Processing 37: 54-115. Although performance is comparable to prior circuit designs (i.e., ART), the tradeoff offered by the present invention allows its insertion into a wider array of hardware contexts with vastly different computational scales. FIG. 6 and FIG. 7, for example, demonstrate parallel and serial SET APART simulations, respectively, for binary inputs.

As shown in FIG. 6, a scan-path 600 from top left to bottom right along each column is performed against the letter 'C' 602 and a previously learned prototype 604 for the letters 'A' and 'B.' Features 1 ($F_1$) through 5 ($F_5$) (and actually up to 7) give no mismatch; thus, keeping the activation of compute node a at zero. Features 8 through 25, however, lead to some matches and mismatches which causes the activation of a to creep close to the vigilance limit by feature 20 ($F_{20}$) and past it by feature 25 ($F_{25}$). Also shown are graphs depicting $R_1$ through $R_{25}$, which are the streaming peaked curves representative of the difference between an input and a chosen category across features $F_1$ to $F_{25}$; $R_1$ to $R_{25}$ are computed in parallel. Additionally, graphs depicting $c_1$ through $c_{25}$ show counters which keep track of the magnitude of the difference between input and chosen category in features $F_1$ to $F_{25}$; $c_1$ to $C_{25}$ are computed in parallel. Finally, graph a depicts the sum of all counters ($c_i$'s); it keeps track of the difference between input and chosen category across all features.

FIG. 6 is to be contrasted with FIG. 7, which depicts another example using the serial version of SET APART. FIG. 7 shows a scan-path 700 from top left to bottom right along each column that is performed against the letter 'C' 702 and a previously learned prototype 704 for the letters 'A' and 'B.' As was the case above, features 1 ($F_1$) through 5 ($F_5$) (and actually up to 7) give no mismatch; thus, keeping the activation of compute node a at zero. Again, features 8 through 25, however, lead to some matches and mismatches which causes the activation of a to creep close to the vigilance limit by feature 20 ($F_{20}$) and past it by feature 25 ($F_{25}$). Also shown are graphs depicting $R_1$ through $R_{25}$, which, as noted above, are the streaming peaked curves representative of the difference between an input and a chosen category across features $F_1$ to $F_{25}$; $R_1$ to $R_{25}$ are computed in series in this example. FIG. 7 is to be contrasted with FIG. 6, in that the serial version of SET APART results in a single c and a, each of which represent a counter which keeps track of the magnitude of the difference between input and chosen category for the current feature and the sum of all counters for features presently seen, respectively, and of which are depicted below the corresponding graphs for R. From left to right, the graphs illustrate serial processing across all features.

Figure 8:
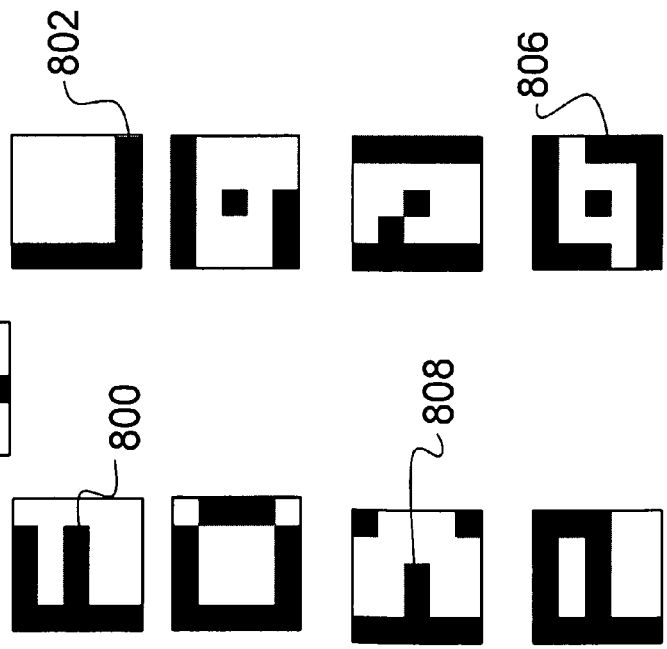
FIG. 8 is an illustration comparing the binary pattern results between SET APART and ART clusters.

FIG. 8 illustrates the clustering of alphabet characters from Carpenter and Grossberg (1987) points by ART with vigilance of 0.5 and SET APART with vigilance of 0.75; this vigilance was chosen because it yielded the same number of clusters for ART and SET APART. As shown, the performance is comparable with identical (or nearly identical) 'F' 800, 'L' 802, and 'T' 804 prototypes and similar 'S-like' 806 and 'K-like' 808 prototypes.

It should be understood that although the examples depicted in FIGS. 6-8 are binary inputs, the present invention is not limited thereto and can be applied to any suitable type of inputs, non-limiting examples of which include analog inputs, gray scale images with each pixel having an integral value between 0 and 255 (or a floating point value between 0.0 and 1.0), etc.

What is claimed is:

1. A computer implemented method for detecting an anomaly through a degree of match between an input and a chosen category, comprising an act of causing a processor to perform operations of:
   receiving, in the processor, at least one streaming peaked curve (R) representative of a difference between an input and a chosen category for a given feature;
   generating a degree of match between the input and the chosen category for all features; and
   comparing the degree of match against a predetermined anomaly threshold and, if the degree of match exceeds the predetermined anomaly threshold, then designating the current input as an anomaly.

2. The method as set forth in claim 1, further comprising acts of:
   a. determining if the streaming peaked curve is increasing over time;
      i. if the streaming peaked curve is increasing over time, then;
         1. incrementing a counter with the streaming peaked curve over time, then repeating the act of determining if the streaming peaked curve is increasing over time;
      ii. if the streaming peaked curve is NOT increasing over time, then the counter is not updated and a peak of the streaming peaked curve is identified, then continuing;
   b. updating a running average of the counter with previous values of the counter and a current value of the counter;
   c. determining if R has just peaked:
      i. if R has not just peaked, then continuing to determine if R has just peaked;
      ii. if R has just peaked, then continuing;
   d. updating a running average of all previously seen featural differences for future iterations;
   e. determining if all featural differences have been received
   i. if all featural differences have not been received, then receiving more streaming peaked curves; and
   ii. if all featural differences have been received, then generating the degree of match between the input and chosen category for all features.

3. The method as set forth in claim 1, further comprising acts of:
   a. receiving, in the processor, at least a second streaming peaked curve (R) such that the processor is collectively receiving a plurality of streaming peaked curves (R), each representative of a difference between an input and a chosen category for a given feature;
b. determining if all features have been accounted for;
  i. if all features have been accounted for, then generating a degree of match between the input and chosen category for all features and ending; and
  ii. if all features have not been accounted for, then continuing;
c. determining, for each streaming peaked curve, if the streaming peaked curve is increasing over time;
  i. if the streaming peaked curve is increasing over time, then;
    1. incrementing a counter with the streaming peaked curve over time;
    2. determining and storing a sum of the counters across all features, then repeating the act of determining if all features have been accounted for; and
  ii. if the streaming peaked curve is NOT increasing over time for the given feature, then stopping the counter and determining if the streaming peaked curve is NOT increasing over time for all streaming peaked curves, then the counters are not updated, then repeating the act of determining if all features have been accounted for.

4. A computer program product for detecting an anomaly, the computer program product comprising computer-readable instruction means stored on a computer-readable medium that are executable by a computer having a processor for causing the processor to perform operations of:
  receiving, in the processor, at least one streaming peaked curve (R) representative of a difference between an input and a chosen category for a given feature;
  generating a degree of match between the input and the chosen category for all features; and
  comparing the degree of match against a predetermined anomaly threshold and, if the degree of match exceeds the predetermined anomaly threshold, then designating the current input as an anomaly.

5. The computer program product as set forth in claim 4, further comprising instruction means for causing the processor to perform operations of:
a. determining if the streaming peaked curve is increasing over time;
  i. if the streaming peaked curve is increasing over time, then;
    1. incrementing a counter with the streaming peaked curve over time, then repeating the act of determining if the streaming peaked curve is increasing over time;
  ii. if the streaming peaked curve is NOT increasing over time, then the counter is not updated and a peak of the streaming peaked curve is identified, then continuing;
b. updating a running average of the counter with previous values of the counter and a current value of the counter;
c. determining if R has just peaked:
  i. if R has not just peaked, then continuing to determine if R has just peaked;
  ii. if R has just peaked, then continuing;
d. updating a running average of all previously seen featural differences for future iterations;
e. determining if all featural differences have been received
  i. if all featural differences have not been received, then receiving more streaming peaked curves; and
  ii. if all featural differences have been received, then generating the degree of match between the input and chosen category for all features.

6. The computer program product as set forth in claim 4, further comprising instruction means for causing the processor to perform operations of:
a. receiving, in the processor, at least a second streaming peaked curve (R) such that the processor is collectively receiving a plurality of streaming peaked curves (R), each representative of a difference between an input and a chosen category for a given feature;
b. determining if all features have been accounted for;
  i. if all features have been accounted for, then generating a degree of match between the input and chosen category for all features and ending; and
  ii. if all features have not been accounted for, then continuing;
c. determining, for each streaming peaked curve, if the streaming peaked curve is increasing over time;
  i. if the streaming peaked curve is increasing over time, then;
    1. incrementing a counter with the streaming peaked curve over time;
    2. determining and storing a sum of the counters across all features, then repeating the act of determining if all features have been accounted for; and
  ii. if the streaming peaked curve is NOT increasing over time for the given feature, then stopping the counter and determining if the streaming peaked curve is NOT increasing over time for all streaming peaked curves, then the counters are not updated, then repeating the act of determining if all features have been accounted for.

7. A system for detecting an anomaly, the system comprising one or more processors configured to perform operations of:
  receiving, in the processor, at least one streaming peaked curve (R) representative of a difference between an input and a chosen category for a given feature;
  generating a degree of match between the input and the chosen category for all features; and
  comparing the degree of match against a predetermined anomaly threshold and, if the degree of match exceeds the predetermined anomaly threshold, then designating the current input as an anomaly.

8. The system as set forth in claim 7, the processor being further configured to perform operations of:
a. determining if the streaming peaked curve is increasing over time;
  i. if the streaming peaked curve is increasing over time, then;
    1. incrementing a counter with the streaming peaked curve over time, then repeating the act of determining if the streaming peaked curve is increasing over time;
  ii. if the streaming peaked curve is NOT increasing over time, then the counter is not updated and a peak of the streaming peaked curve is identified, then continuing;
b. updating a running average of the counter with previous values of the counter and a current value of the counter;
c. determining if R has just peaked:
  i. if R has not just peaked, then continuing to determine if R has just peaked;
  ii. if R has just peaked, then continuing;
d. updating a running average of all previously seen featural differences for future iterations;
e. determining if all featural differences have been received
  i. if all featural differences have not been received, then receiving more streaming peaked curves; and ii. if all featural differences have been received, then generating the degree of match between the input and chosen category for all features.

9. The system as set forth in claim 7, the processor being further configured to perform operations of:
   a. receiving, in the processor, at least a second streaming peaked curve (R) such that the processor is collectively receiving a plurality of streaming peaked curves (R), each representative of a difference between an input and a chosen category for a given feature;
   b. determining if all features have been accounted for;
      i. if all features have been accounted for, then generating a degree of match between the input and chosen category for all features and ending; and
      ii. if all features have not been accounted for, then continuing;
   c. determining, for each streaming peaked curve, if the streaming peaked curve is increasing over time;
      i. if the streaming peaked curve is increasing over time, then;
         1. incrementing a counter with the streaming peaked curve over time;
         2. determining and storing a sum of the counters across all features, then repeating the act of determining if all features have been accounted for; and
      ii. if the streaming peaked curve is NOT increasing over time for the given feature, then stopping the counter and determining if the streaming peaked curve is NOT increasing over time for all streaming peaked curves, then the counters are not updated, then repeating the act of determining if all features have been accounted for.

* * * * *